(12) United States Patent
Kim

(10) Patent No.: US 12,733,029 B2
(45) Date of Patent: Sep. 8, 2026

(54) METHOD AND DEVICE FOR TRANSMITTING AND RECEIVING DATA IN COMMUNICATION SYSTEM SUPPORTING MULTIPLE LINKS

(71) Applicants: HYUNDAI MOTOR COMPANY, Seoul (KR); KIA CORPORATION, Seoul (KR); Korea National University of Transportation Industry-Academic Cooperation Foundation, Chungju-si (KR)

(72) Inventor: Yong Ho Kim, Incheon (KR)

(73) Assignees: HYUNDAI MOTOR COMPANY, Seoul (KR); Kia Corporation, Seoul (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 266 days.

(21) Appl. No.: 18/382,668

(22) Filed: Oct. 23, 2023

(65) Prior Publication Data

US 2024/0049277 A1 Feb. 8, 2024

Related U.S. Application Data

(63) Continuation-in-part of application No. PCT/KR2022/005663, filed on Apr. 20, 2022.

(30) Foreign Application Priority Data

Apr. 23, 2021 (KR) ........................ 10-2021-0053074
Apr. 26, 2021 (KR) ........................ 10-2021-0053954

(51) Int. Cl.
*H04W 74/00* (2009.01)
*H04W 74/08* (2009.01)

(52) U.S. Cl.
CPC ..... *H04W 74/002* (2013.01); *H04W 74/0866* (2013.01)

(58) Field of Classification Search
CPC ........... H04W 74/002; H04W 74/0816; H04W 74/0866; H04W 76/15; H04W 84/12
(Continued)

(56) References Cited

U.S. PATENT DOCUMENTS

2010/0195664 A1* 8/2010 Ho ........................ H04L 12/413 370/445
2017/0195991 A1 7/2017 Ahn et al.
(Continued)

FOREIGN PATENT DOCUMENTS

EP 3998799 A1 5/2022
KR 10-2020-0014427 A 2/2020
(Continued)

OTHER PUBLICATIONS

International Search dated Aug. 3, 2022 cited in International Patent Application No. PCT/KR2022/005663 (w/English translation).
(Continued)

*Primary Examiner* — Stephen J Clawson
(74) *Attorney, Agent, or Firm* — Morgan, Lewis & Bockius LLP

(57) ABSTRACT

A method and device for transmitting and receiving data in a communication system supporting multiple links include the steps of performing a first backoff operation for a first frame to be transmitted to first STA MLD in a first link from among multiple links; performing a second backoff operation for a second frame to be transmitted to second STA MLD in the first link; deferring transmission to the first frame if the first backoff operation is complete and communication between the AP MLD and the first STA MLD is established in a second link from among the multiple links;
(Continued)

and transmitting the second frame to the second STA MLD in the first link if the second backoff operation is complete.

18 Claims, 10 Drawing Sheets

(58) Field of Classification Search
USPC .......................................................... 370/320
See application file for complete search history.

(56) References Cited

U.S. PATENT DOCUMENTS

| | | | | |
|---|---|---|---|---|
| 2019/0191414 | A1 | 6/2019 | Bang et al. | |
| 2021/0068184 | A1 | 3/2021 | Chu et al. | |
| 2021/0160347 | A1* | 5/2021 | Chu | H04L 69/14 |
| 2021/0160941 | A1* | 5/2021 | Patil | H04W 74/0808 |
| 2021/0195540 | A1* | 6/2021 | Fischer | H04W 56/0005 |
| 2021/0251006 | A1* | 8/2021 | Cariou | H04W 74/0816 |
| 2022/0150958 | A1* | 5/2022 | Chu | H04W 74/0866 |
| 2022/0312506 | A1* | 9/2022 | Xia | H04W 74/0891 |
| 2022/0338253 | A1* | 10/2022 | Lu | H04W 74/085 |
| 2022/0418018 | A1* | 12/2022 | Jang | H04W 76/15 |

FOREIGN PATENT DOCUMENTS

| | | | |
|---|---|---|---|
| KR | 10-2021-0004869 | A | 1/2021 |
| KR | 10-2021-007881 | A | 1/2021 |
| KR | 10-2021-0019588 | A | 2/2021 |
| WO | 2021/006545 | A1 | 1/2021 |

OTHER PUBLICATIONS

L. Lu, “Discussion on 802.11be features to support TSN capabilities,” 802.11-21/0681R0, Apr. 16, 2021.

Jang et al., “Non-AP MLD Initiated Aggregation: Opportunity in TXOP”, doc.: IEEE 802.11-20/0739rl, Jul. 2020, Slides 1-17.

* cited by examiner

【FIG. 1】

Figure 6B:
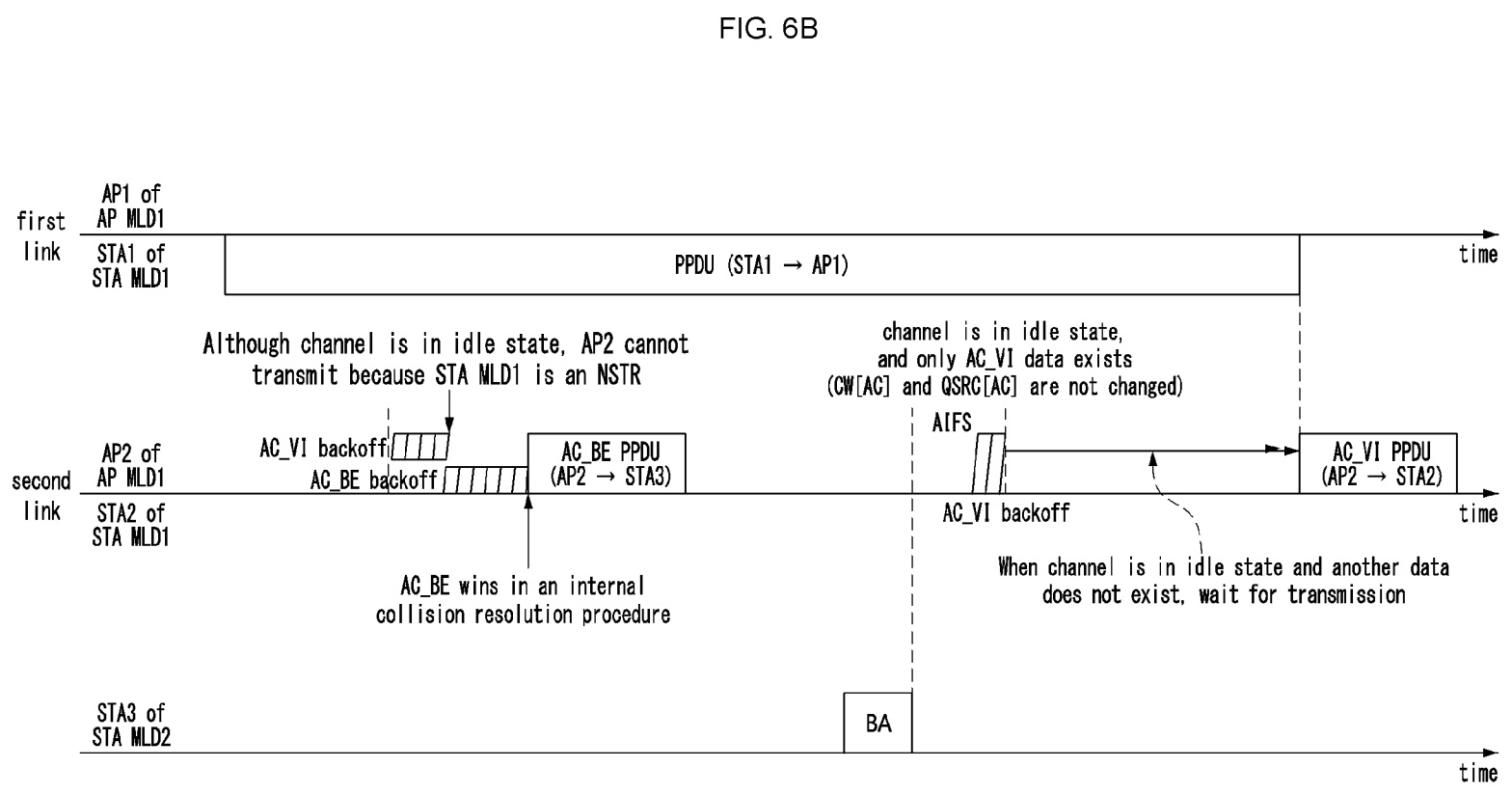

FIG. 6B first link
AP1 of AP MLD1
STA1 of STA MLD1
PPDU (STA1 → AP1)
time second link
AP2 of AP MLD1
STA2 of STA MLD1
Although channel is in idle state, AP2 cannot transmit because STA MLD1 is an NSTR
AC_VI backoff
AC_BE backoff
AC_BE PPDU (AP2 → STA3)
AC_BE wins in an internal collision resolution procedure
channel is in idle state, and only AC_VI data exists (CW[AC] and QSRC[AC] are not changed)
AIFS
AC_VI backoff
When channel is in idle state and another data does not exist, wait for transmission
AC_VI PPDU (AP2 → STA2)
time STA3 of STA MLD2
BA
time

Figure 8:
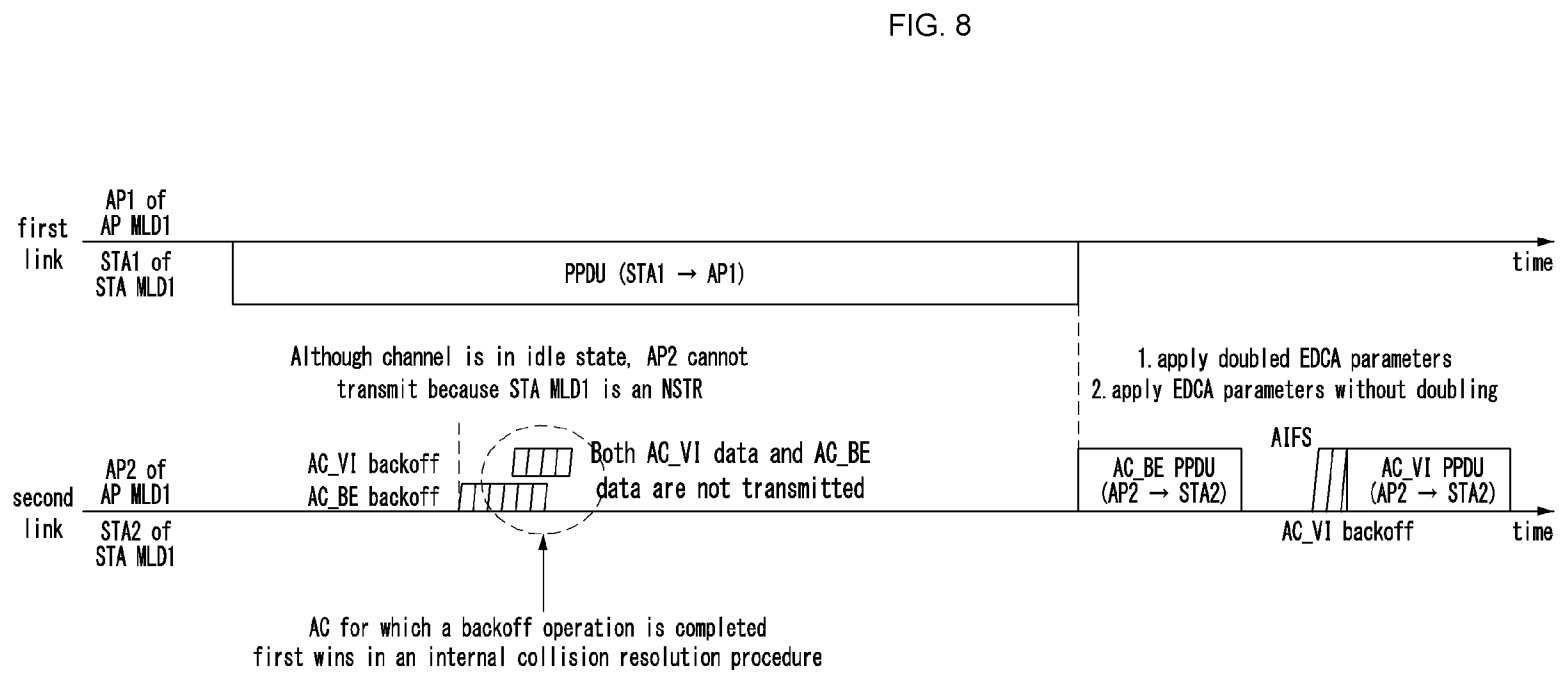

FIG. 8 first link
AP1 of AP MLD1
STA1 of STA MLD1
PPDU (STA1 → AP1)
time

Although channel is in idle state, AP2 cannot transmit because STA MLD1 is an NSTR 1. apply doubled EDCA parameters
2. apply EDCA parameters without doubling second link
AP2 of AP MLD1
STA2 of STA MLD1
AC_VI backoff
AC_BE backoff
Both AC_VI data and AC_BE data are not transmitted
AC_BE PPDU (AP2 → STA2)
AIFS
AC_VI backoff
AC_VI PPDU (AP2 → STA2)
time AC for which a backoff operation is completed first wins in an internal collision resolution procedure

METHOD AND DEVICE FOR TRANSMITTING AND RECEIVING DATA IN COMMUNICATION SYSTEM SUPPORTING MULTIPLE LINKS

CROSS-REFERENCE TO RELATED APPLICATION

The present application is a continuation-in-part of currently pending International Patent Application No. PCT/KR2022/005663 filed Apr. 20, 2022, which claims priority to Korean Patent Application No. 10-2021-0053954, filed Apr. 26, 2021 and Korean Patent Application No. 10-2021-0053074, filed Apr. 23, 2021, the entire contents of which are incorporated herein for all purposes by these references.

BACKGROUND OF THE PRESENT DISCLOSURE

Field of the Present Disclosure

The present disclosure relates to a wireless local area network (LAN) communication technique, and more particularly, to a technique for transmission and reception of data by a device that does not support simultaneous transmit and receive (STR) operations.

Description of Related Art

Recently, as the spread of mobile devices expands, a wireless local area network technology capable of providing fast wireless communication services to mobile devices is in the spotlight. The wireless LAN technology may be a technology that supports mobile devices such as smart phones, smart pads, laptop computers, portable multimedia players, embedded devices, and the like to wirelessly access the Internet based on wireless communication technology.

The standards using the wireless LAN technology are being standardized as IEEE802.11 standards mainly in the Institute of Electrical and Electronics Engineers (IEEE). As the above-described wireless LAN technologies have been developed and spread, applications using the wireless LAN technologies have been diversified, and a demand for a wireless LAN technology supporting a higher throughput has arisen. Accordingly, a frequency bandwidth (e.g., 'maximum 160 MHz bandwidth' or '80+80 MHz bandwidth') used in the IEEE 802.11ac standard has been expanded, and the number of supported spatial streams has also increased. The IEEE 802.11ac standard may be a very high throughput (VHT) wireless LAN technology supporting a high throughput of 1 gigabit per second (Gbps) or more. The IEEE 802.1 lac standard can support downlink transmission for multiple stations by utilizing the MIMO techniques.

As applications requiring higher throughput and applications requiring real-time transmission occur, the IEEE 802.11be standard, which is an extreme high throughput (EHT) wireless LAN technology, is being developed. The goal of the IEEE 802.11be standard may be to support a high throughput of 30 Gbps. The IEEE 802.11be standard may support techniques for reducing a transmission latency. In addition, the IEEE 802.11be standard can support a more expanded frequency bandwidth (e.g., 320 MHz bandwidth), multi-link transmission and aggregation operations including multi-band operations, multiple access point (AP) transmission operations, and/or efficient retransmission operations (e.g., hybrid automatic repeat request (HARQ) operations).

However, since multi-link operations are operations not defined in the existing wireless LAN standard, it may be necessary to define detailed operations according to an environment in which the multi-link operations are performed. In particular, when two or more links are adjacent, simultaneous transmit and receive (STR) operations may not be performed on a multi-link due to interference from adjacent links (e.g., adjacent bands, adjacent channels). If a level of signal interference between adjacent links is above a certain level, a channel sensing operation and/or signal reception operation for transmission on another link may not be performed due to the interference while a transmission operation is performed on one link. In the above-described situation, methods for transmitting and receiving data based on a channel access procedure considering a transmission and reception status of the one link may be required.

Meanwhile, the technologies that are the background of the present disclosure are written to improve the understanding of the background of the present disclosure and may include content that is not already known to those of ordinary skill in the art to which the present disclosure belongs.

BRIEF SUMMARY

Various aspects of the present disclosure are directed to providing a method and an apparatus for transmission and reception of data for a device that does not support STR operations in a communication system supporting multiple links.

A method of a first device, according to various exemplary embodiments of the present disclosure for achieving the above-described objective, may include: performing a first backoff operation for a first data unit on a first link; in response that the first backoff operation is completed on the first link, a recipient of the first data unit is a second device, and the second device is performing communication on a second link, maintaining a counter value of the first backoff operation at 0; and in response that the communication of the second device on the second link is completed, initiating a first transmission procedure of the first data unit on the first link.

The counter value of the first backoff operation may be maintained at 0 until the communication of the second device on the second link is completed.

The first transmission procedure on the first link may be initiated when an event indicating that the first data unit has occurred is identified.

The second device may not support a simultaneous transmit and receive (STR) operation on the first link and the second link.

The method may further include: performing a second backoff operation for a second data unit on the first link; and in response that the first backoff operation and the second backoff operation are completed on the first link, determining that one backoff operation among the first backoff operation and the second backoff operation is successful, based on a preconfigured criterion.

The method may further include: in response that the one backoff operation is the first backoff operation, initiating a second transmission procedure of the second data unit after completion of the first transmission procedure.

When the preconfigured criterion is a completion order of backoff operations, the one backoff operation completed first among the first backoff operation and the second backoff operation may be determined to be successful.

When the preconfigured criterion is a priority of an access category (AC), the one backoff operation associated with an AC having a highest priority among the first backoff operation and the second backoff operation may be determined to be successful.

A first device, according to various exemplary embodiments of the present disclosure for achieving the above-described objective, may include: a processor; and a memory configured for storing one or more instructions executable by the processor, wherein the one or more instructions are executed to perform: performing a first backoff operation for a first data unit on a first link; in response that the first backoff operation is completed on the first link, a recipient of the first data unit is a second device, and the second device is performing communication on a second link, maintaining a counter value of the first backoff operation at 0; and in response that the communication of the second device on the second link is completed, initiating a first transmission procedure of the first data unit on the first link.

The counter value of the first backoff operation may be maintained at 0 until the communication of the second device on the second link is completed.

The first transmission procedure on the first link may be initiated when an event indicating that the first data unit has occurred is identified.

The second device may not support a simultaneous transmit and receive (STR) operation on the first link and the second link.

The one or more instructions may be further executed to perform: performing a second backoff operation for a second data unit on the first link; and in response that the first backoff operation and the second backoff operation are completed on the first link, determining that one backoff operation among the first backoff operation and the second backoff operation is successful, based on a preconfigured criterion.

The one or more instructions may be further executed to perform: in response that the one backoff operation is the first backoff operation, initiating a second transmission procedure of the second data unit after completion of the first transmission procedure.

When the preconfigured criterion is a completion order of backoff operations, the one backoff operation completed first among the first backoff operation and the second backoff operation may be determined to be successful.

When the preconfigured criterion is a priority of an access category (AC), the one backoff operation associated with an AC including a highest priority among the first backoff operation and the second backoff operation may be determined to be successful.

According to an exemplary embodiment of the present disclosure, communication between devices (e.g., stations, access points) may be performed using a multi-link. When some links (e.g., some channels) of the multi-link are adjacent, a simultaneous transmit and receive (STR) operation may not be performed. When a first station performs transmission using a first link of the multi-link, an access point may not be able to transmit a frame to a second station using a second link of the multi-link. In the instant case, the access point may perform a channel access operation on the second link in advance according to a channel state for transmission to the second station, and when transmission of the first station on the first link is completed, the access point may transmit a frame to the second station on the second link. Accordingly, transmission efficiency may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6B is a timing diagram illustrating various exemplary embodiments of a channel access method in a wireless LAN system supporting a multi-link.

FIG. 8 is a timing diagram illustrating various exemplary embodiments of a channel access method in a wireless LAN system supporting a multi-link.

Figure 1:
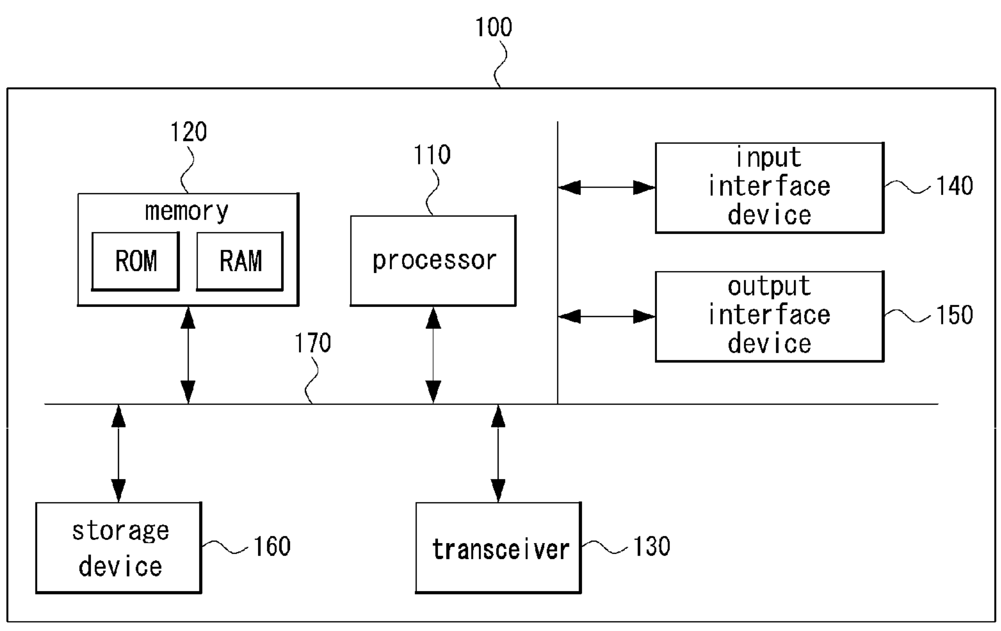
FIG. 1 is a block diagram illustrating various exemplary embodiments of a communication node constituting a wireless LAN system.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term “and/or” means any one or a combination of a plurality of related and described items.

In exemplary embodiments of the present disclosure, “at least one of A and B” may refer to “at least one of A or B” or “at least one of combinations of one or more of A and B”. In addition, “one or more of A and B” may refer to “one or more of A or B” or “one or more of combinations of one or more of A and B”.

When it is mentioned that a certain component is “coupled with” or “connected with” another component, it should be understood that the certain component is directly “coupled with” or “connected with” to the other component or a further component may be disposed therebetween. In contrast, when it is mentioned that a certain component is “directly coupled with” or “directly connected with” another component, it will be understood that a further component is not disposed therebetween.

The terms used in the present disclosure are only used to describe specific embodiments, and are not intended to limit the present disclosure. The singular expression includes the plural expression unless the context clearly dictates otherwise. In the present disclosure, terms such as ‘comprise’ or ‘have’ are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

In the following, a wireless communication system to which exemplary embodiments according to the present disclosure are applied will be described. The wireless communication system to which the exemplary embodiments according to the present disclosure are applied is not limited to the contents described below, and the exemplary embodiments according to the present disclosure can be applied to various wireless communication systems. A wireless communication system may be referred to as a ‘wireless communication network’.

FIG. 1 is a block diagram illustrating a first exemplary embodiment of a communication node constituting a wireless LAN system.

As shown in FIG. 1, a communication node 100 may be an access point, a station, an access point (AP) multi-link device (MLD), or a non-AP MLD. An access point may refer to ‘AP’, and a station may refer to ‘STA’ or ‘non-AP STA’. An operating channel width supported by an AP may be 20 megahertz (MHz), 80 MHz, 160 MHz, or the like. An operating channel width supported by a STA may be 20 MHz, 80 MHz, or the like.

The communication node 100 may include at least one processor 110, a memory 120, and a transceiver 130 connected to a network to perform communications. The transceiver 130 may be referred to as a transceiver, a radio frequency (RF) unit, an RF module, or the like. In addition, the communication node 100 may further include an input interface device 140, an output interface device 150, a storage device 160, and the like. The respective components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, and the storage device 160 through a dedicated interface.

The processor 110 may execute program commands stored in at least one of the memory 120 and the storage device 160. The processor 110 may refer to a central processing unit (CPU), a graphics processing unit (GPU), or a dedicated processor on which the methods according to the exemplary embodiments of the present disclosure are performed. Each of the memory 120 and the storage device 160 may be configured as at least one of a volatile storage medium and a nonvolatile storage medium. For example, the memory 120 may be configured with at least one of a read only memory (ROM) and a random access memory (RAM).

Figure 2:
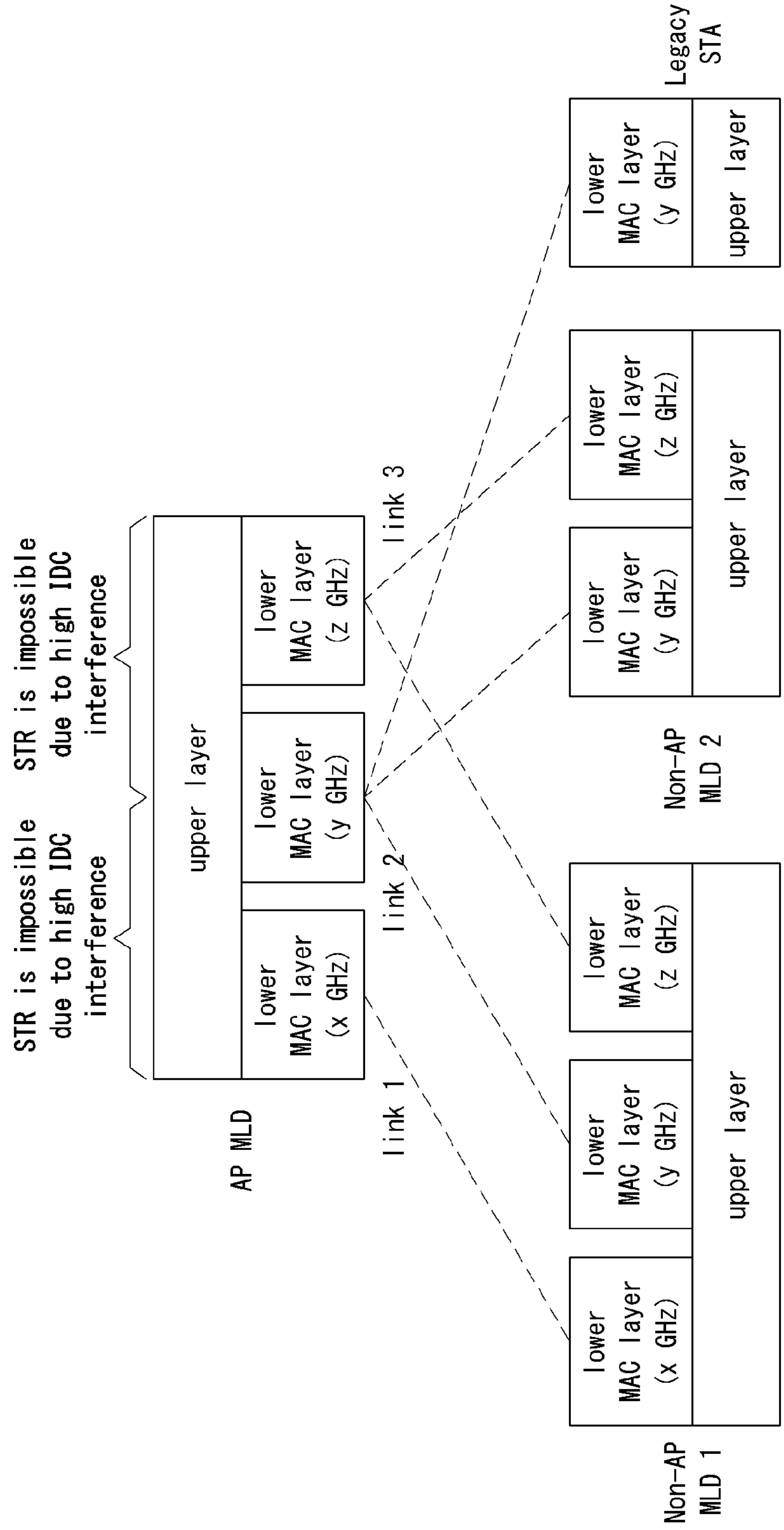
FIG. 2 is a conceptual diagram illustrating various exemplary embodiments of a multi-link configured between multi-link devices (MLDs).

FIG. 2 is a conceptual diagram illustrating a first exemplary embodiment of a multi-link configured between multi-link devices (MLDs).

As shown in FIG. 2, an MLD may have one medium access control (MAC) address. In exemplary embodiments of the present disclosure, the MLD may mean an AP MLD and/or non-AP MLD. The MAC address of the MLD may be used in a multi-link setup procedure between the non-AP MLD and the AP MLD. The MAC address of the AP MLD may be different from the MAC address of the non-AP MLD. AP(s) affiliated with the AP MLD may have different MAC addresses, and station(s) affiliated with the non-AP MLD may have different MAC addresses. Each of the APs having different MAC addresses within the AP MLD may be in charge of each link, and may perform a role of an independent AP.

Each of the STAs having different MAC addresses within the non-AP MLD may be in charge of each link, and may perform a role of an independent STA. The non-AP MLD may be referred to as a STA MLD. The MLD may support a simultaneous transmit and receive (STR) operation. In the instant case, the MLD may perform a transmission operation in a link 1 and may perform a reception operation in a link 2. The MLD supporting the STR operation may be referred to as an STR MLD (e.g., STR AP MLD, STR non-AP MLD). In exemplary embodiments of the present disclosure, a link may mean a channel or a band. A device that does not support the STR operation may be referred to as a non-STR (NSTR) AP MLD or an NSTR non-AP MLD (or NSTR STA MLD).

The MLD may transmit and receive frames in multiple links by use of a non-contiguous bandwidth extension scheme (e.g., 80 MHz+80 MHz). The multi-link operation may include multi-band transmission. The AP MLD may include a plurality of APs, and the plurality of APs may operate in different links. Each of the plurality of APs may perform function(s) of a lower MAC layer. Each of the plurality of APs may be referred to as a 'communication node' or 'lower entity'. The communication node (i.e., AP) may operate under control of an upper layer (or the processor 110 shown in FIG. 2). The non-AP MLD may include a plurality of STAs, and the plurality of STAs may operate in different links. Each of the plurality of STAs may be referred to as a 'communication node' or 'lower entity'. The communication node (i.e., STA) may operate under control of an upper layer (or the processor 110 shown in FIG. 2).

The MLD may perform communications in multiple bands (i.e., multi-band). For example, the MLD may perform communications using an 80 MHz bandwidth according to a channel expansion scheme (e.g., bandwidth expansion scheme) in a 2.4 GHz band, and perform communications using a 160 MHz bandwidth according to a channel expansion scheme in a 5 GHz band. The MLD may perform communications using a 160 MHz bandwidth in the 5 GHz band, and may perform communications using a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band. The respective links may be referred to as a first link, a second link, and a third link. Alternatively, each link may be referred to as a link 1, a link 2, a link 3, or the like. A link number may be set by an access point, and an identifier (ID) may be assigned to each link.

The MLD (e.g., AP MLD and/or non-AP MLD) may configure a multi-link by performing an access procedure and/or a negotiation procedure for a multi-link operation. In the instant case, the number of links and/or link(s) to be used in the multi-link may be configured. The non-AP MLD (e.g., STA) may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. A station that does not support a multi-link operation (e.g., IEEE 802.11 a/b/g/n/ac/ax STA) may be connected to one or more links of the multi-link supported by the AP MLD.

When a band separation between multiple links (e.g., a band separation between a link 1 and a link 2 in the frequency domain) is sufficient, the MLD may be able to perform an STR operation. For example, the MLD may transmit a physical layer convergence procedure (PLCP) protocol data unit (PPDU) 1 using the link 1 among multiple links, and may receive a PPDU 2 using the link 2 among multiple links. On the other hand, if the MLD performs an STR operation when the band separation between multiple links is not sufficient, in-device coexistence (IDC) interference, which is interference between the multiple links, may occur. Accordingly, when the bandwidth separation between multiple links is not sufficient, the MLD may not be able to perform an STR operation. A link pair having the above-described interference relationship may be a non-simultaneous transmit and receive (NSTR)-limited link pair. Here, the MLD that cannot perform STR operations due to the influence of the NSTR-limited link pair may be an NSTR AP MLD or NSTR non-AP MLD. The NSTR non-AP MLD may not be able to perform STR operations on any link pair unrelated to the NSTR-limited link pair.

For example, a multi-link including a link 1, a link 2, and a link 3 may be configured between an AP MLD and a non-AP MLD 1. When a band separation between the link 1 and the link 3 is sufficient, the AP MLD may perform an STR operation using the link 1 and the link 3. That is, the AP MLD may transmit a frame using the link 1 and receive a frame using the link 3. When a band separation between the link 1 and the link 2 is insufficient, the AP MLD may not be able to perform an STR operation using the link 1 and the link 2. When a band separation between the link 2 and the link 3 is not sufficient, the AP MLD may not be able to perform an STR operation using the link 2 and the link 3.

Meanwhile, in a wireless LAN system, a negotiation procedure for a multi-link operation may be performed in an access procedure between a station and an access point.

A device (e.g., access point, station) that supports multiple links may be referred to as 'multi-link device (MLD)'. An access point supporting multiple links may be referred to as 'AP MLD', and a station supporting multiple links may be referred to as 'non-AP MLD' or 'STA MLD'. The AP MLD may have a physical address (e.g., MAC address) for each link. The AP MLD may be implemented as if an AP in charge of each link exists separately. A plurality of APs may be managed within one AP MLD. Therefore, coordination between a plurality of APs belonging to the same AP MLD may be possible. A STA MLD may have a physical address (e.g., MAC address) for each link. The STA MLD may be implemented as if a STA in charge of each link exists separately. A plurality of STAs may be managed within one STA MLD. Therefore, coordination between a plurality of STAs belonging to the same STA MLD may be possible.

For example, an AP1 of the AP MLD and a STA1 of the STA MLD may each be responsible for a first link and perform communication using the first link. An AP2 of the AP MLD and a STA2 of the STA MLD may each be responsible for a second link and perform communication using the second link. The STA2 may receive status change information for the first link on the second link. In the instant case, the STA MLD may collect information (e.g., status change information) received on the respective links, and control operations performed by the STA1 based on the collected information.

Hereinafter, data transmission and reception methods in a wireless LAN system will be described. Even when a method (e.g., transmission or reception of a signal) performed at a first communication node among communication nodes is described, a corresponding second communication node may perform a method (e.g., reception or transmission of the signal) corresponding to the method performed at the first communication node. That is, when an operation of a STA is described, an AP corresponding thereto may perform an operation corresponding to the operation of the STA. Conversely, when an operation of an AP is described, a STA corresponding thereto may perform an operation corresponding to the operation of the AP. In exemplary embodiments of the present disclosure, an operation of a STA may be interpreted as an operation of a STA MLD, an operation of a STA MLD may be interpreted as an operation of a STA, an operation of an AP may be interpreted as an operation of an AP MLD, and an operation of an AP MLD may be interpreted as an operation of an AP.

Figure 3:
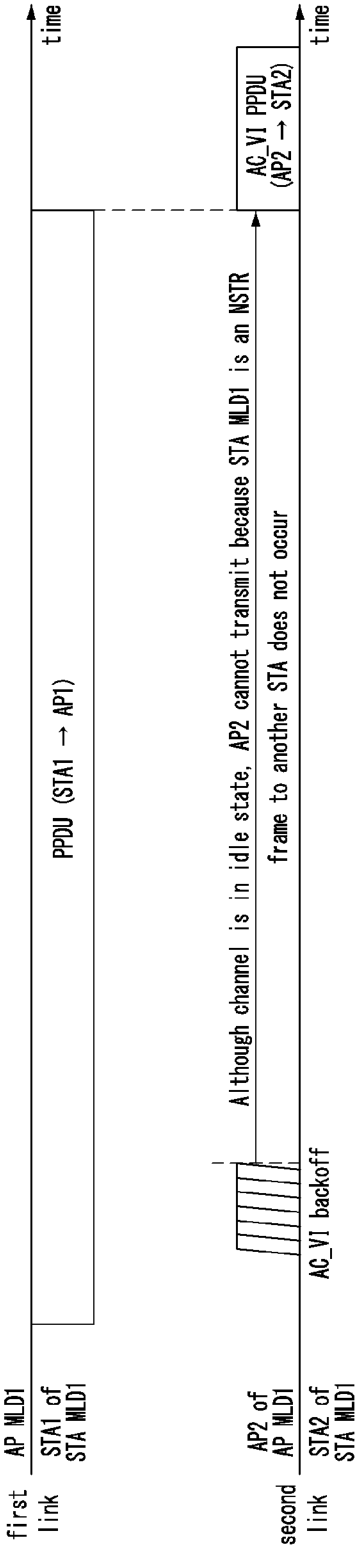
FIG. 3 is a timing diagram illustrating various exemplary embodiments of a channel access method in a wireless LAN system supporting a multi-link.

FIG. 3 is a timing diagram illustrating a first exemplary embodiment of a channel access method in a wireless LAN system supporting a multi-link.

As shown in FIG. 3, an AP MLD that supports STR operations may be referred to as 'STR AP MLD', and a non-AP MLD that does not support STR operations may be referred to as 'NSTR non-AP MLD (or NSTR STA MLD)'. An AP MLD1 may be a STR AP MLD, and a STA MLD1 may be an NSTR STA MLD. The AP MLD1 may transmit and receive data frames with the STA MLD1 using a multi-link. A STA1 of the STA MLD1 may transmit a PPDU to an AP1 of the AP MLD1 using the first link. The PPDU may be referred to as a data unit. Transmission of a PPDU may mean transmission of a frame including the PPDU (e.g., data unit). Since the STA MLD1 does not support STR operations, a STA2 of the STA MLD1 may not be able to receive data on a second link during a period in which the STA1 of the STA MLD1 transmits the PPDU on the first link. The PPDU may refer to a data frame.

The AP2 of AP MLD1 may perform a backoff operation for each access category (AC). Priorities of ACs may be defined as in Table 1 below, and a contention window (CW) of each AC may be defined as in Table 2 below.

TABLE 1

| Priority | AC | Description |
|---|---|---|
| Lowest | AC_BK | Background |
| Highest | AC_BE | Best effort |
| | AC_VI | Video |
| | AC_VO | Voice |

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

When a frame corresponding to AC_VI (hereinafter referred to as 'AC_VI frame' or 'AC_VI PPDU') exists in a queue, the AP2 of AP MLD1 may perform a backoff operation using a backoff parameter for AC_VI (hereinafter referred to as 'AC_VI backoff parameter'). If a channel (e.g., wireless medium (WM)) state remains idle while the backoff counter value (e.g., AC_VI backoff counter value) is decreased, the backoff counter value may become 0. The backoff counter value may be referred to as a backoff counter. When the backoff counter value becomes 0, the AP2 of AP MLD1 may transmit an AC_VI frame. However, since the STA1 of STA MLD1 is transmitting on the first link and the AC_VI frame is a frame to be received by the STA2 of STA MLD1, the AP2 of AP MLD1 may not transmit the AC_VI frame even when the backoff counter value is 0. That is, since the STA MLD1 is an NSTR non-AP MLD that does not support STR operations, the AP2 of AP MLD1 may wait for transmission of the AC_VI frame when the backoff counter value is 0. The AP2 of AP MLD1 may assume that there is no AC_VI data in the queue until a transmission completion time of the PPDU transmitted by the STA1 of STA MLD1 on the first link, and based on the above-mentioned assumption, the AP2 of AP MLD1 may wait for transmission of the AC_VI data when the backoff counter value is 0. If data to another STA does not occur (e.g., if no data to transmit occurs in the queue) until the transmission completion time of the PPDU transmitted by the STA1 of STA MLD1 on the first link, the AP2 of AP MLD1 may initiate a transmission procedure of AC_VI data to be transmitted to the STA2 of STA MLD1 at the transmission completion time of the PPDU transmitted by the STA1 of STA MLD1 on the first link. That is, the AP MLD1 may generate an event indicating that AC_VI data, which was assumed to be not in the AP2's queue, occurs at the transmission completion time of the PPDU on the first link, and in the instant case, the AP2 of AP MLD1 may initiate a transmission procedure of AC_VI data because a channel state is in an idle state and the backoff counter value is 0. When the channel state is in the idle state and the backoff counter of the AC corresponding to data to be transmitted is 0, the data may be transmitted immediately in the above-described transmission procedure. Alternatively, the backoff operation for data transmission in the above-described transmission procedure may be initiated again, and the data may be transmitted after completion of the backoff operation. The backoff parameters or EDCA parameters CW[AC] and/or QSRC[AC] used in the backoff operation may be the same as the previously used parameters.

Figure 4:
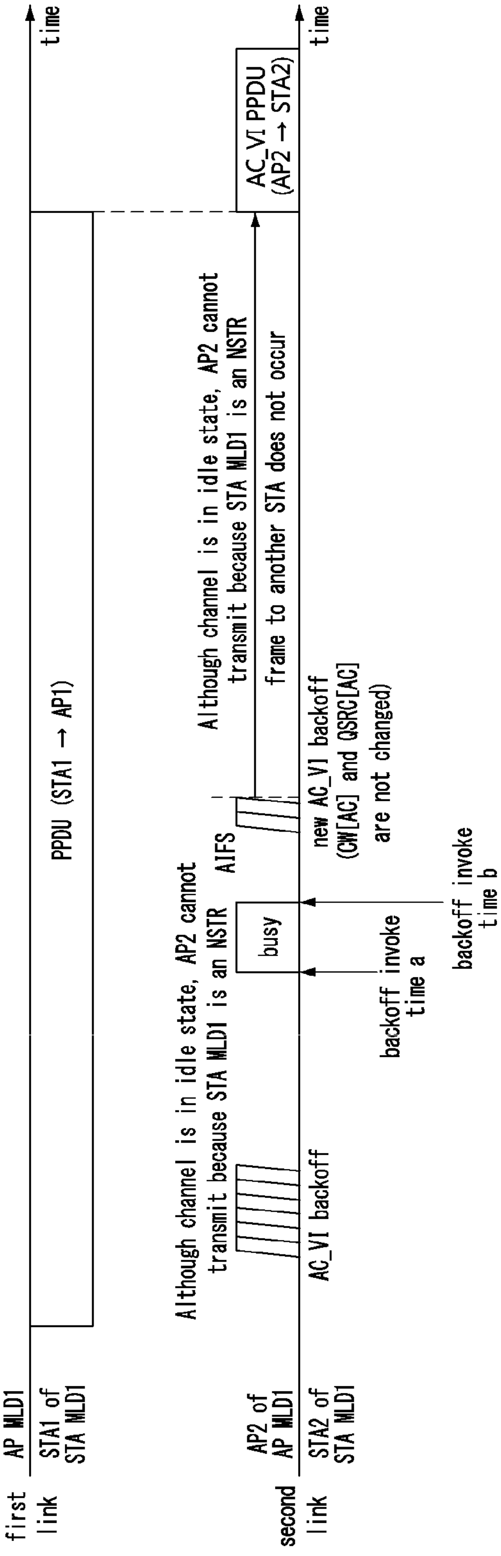
FIG. 4 is a timing diagram illustrating various exemplary embodiments of a channel access method in a wireless LAN system supporting a multi-link.

FIG. 4 is a timing diagram illustrating a second exemplary embodiment of a channel access method in a wireless LAN system supporting a multi-link.

As shown in FIG. 4, an AP MLD1 may be a STR AP MLD that supports STR operations, and a STA MLD1 may be an NSTR STA MLD that does not support STR operations. The AP MLD1 may transmit and receive data frames with the STA MLD1 using a multi-link. A STA1 of the STA MLD1 may transmit a PPDU to an AP1 of the AP MLD1 using a first link. Since the STA MLD1 is an NSTR STA MLD that does not support STR operations, a STA2 of the STA MLD1 may not be able to receive data on a second link during a period in which the STA1 of STA MLD1 transmits the PPDU on the first link.

The AP2 of AP MLD1 may perform a backoff operation for each AC. When AC_VI data is present in a queue, the AP2 of AP MLD1 may perform a backoff operation using an AC_VI backoff parameter. If a channel state remains idle while the backoff counter value (e.g., AC_VI backoff counter value) is decreased, the backoff counter value may become 0. When the backoff counter value becomes 0, the AP2 of AP MLD1 may transmit an AC_VI frame. However, since the STA1 of STA MLD1 is transmitting on the first link and the AC_VI frame is a frame to be received by the STA2 of STA MLD1, the AP2 of AP MLD1 may not transmit the AC_VI frame even when the backoff counter value is 0. That is, since the STA MLD1 is an NSTR non-AP MLD that does not support STR operations, the AP2 of AP MLD1 may wait for transmission of the AC_VI frame with the backoff counter value being 0. The AP2 of AP MLD1 may assume that there is no AC_VI data in the queue until a transmission completion time of the PPDU transmitted by the STA1 of STA MLD1 on the first link, and based on the above-mentioned assumption, the AP2 of AP MLD1 may wait for transmission of the AC_VI data with the backoff counter value being 0.

While waiting for transmission of the AC_VI data, the channel state may change from the idle state to a busy state. The channel state may be changed to the busy state by frame transmission and reception in another basic service set (BSS). Alternatively, the channel state may be changed to the busy state due to a frame transmission and reception operation between another STA and the AP2. The communication node (e.g., AP, STA, MLD) may determine the channel state (e.g., idle state or busy state) by performing physical carrier sensing or virtual carrier sensing.

While waiting for transmission of AC_VI data, the channel state may change from the idle state to the busy state. In the instant case, the AP2 of AP MLD1 may invoke a backoff operation. A time of invoking the backoff operation may be a time at which the channel state changes from the idle state to the busy state. The corresponding time may be referred to as 'backoff invoke time a'. Alternatively, the time of invoking the backoff operation may be a time at which the channel state changes from the busy state to the idle state. The corresponding time may be referred to as 'backoff invoke time b'. At the time of invoking the backoff operation, the AP MLD1 may invoke the backoff operation by generating an event indicating that AC_VI data, which was assumed not to be in the AP2's queue occurs. Alternatively, the backoff operation may be invoked regardless of a state of the queue at the backoff invoke time b. When the backoff operation is invoked at the backoff invoke time a, the backoff operation may be performed after changing from the busy state to the idle state and waiting for an AIFS. When the backoff operation is invoked at the backoff invoke time b, the backoff operation may be performed immediately without waiting for an AIFS.

The case where the AP2 of AP MLD1 invokes the backoff operation at the backoff invoke time a may correspond to a case where the AP2 of AP MLD1 does not consider transmission of the STA1 of STA MLD1 on the first link. When the AP2 of AP MLD1 invokes the backoff operation at the backoff invoke time a, since the channel state is in the busy state and the backoff counter value of AC_VI is 0, the AP2 of AP MLD1 may select a new AC_VI backoff counter value, and may continue to sense the channel state based on the new AC_VI backoff counter value. Since the previous transmission has not failed, the new AC_VI backoff counter value may be selected without changing the backoff parameters or the EDCA parameters CW[AC] and/or QSRC[AC]. CW[AC] may be a CW for each AC. QSRC[AC] may be a quality of service (QoS) short retry counter (QSRC) for each AC. CW[AC] and/or QSRC[AC] may be enhanced distributed channel access (EDCA) parameters. The backoff operation may be an EDCA function (EDCAF).

The AP2 of AP MLD1 may decrease the AC_VI backoff counter value (e.g., new AC_VI backoff counter value) from a time at which the channel state is changed to the idle state and while the channel state remains in the idle state, and the AC_VI backoff counter value may become 0. When the AC_VI backoff counter value becomes 0, the AP2 of AP MLD1 may transmit an AC_VI frame. However, when the STA1 of STA MLD1 is transmitting on the first link and the AC_VI frame is a frame to be transmitted to the STA2 of STA MLD1, the AP2 of AP MLD1 may not transmit the AC_VI frame even when the backoff counter value is 0. That is, since the STA MLD1 is an NSTR non-AP MLD that does not support STR operations, the AP2 of AP MLD1 may wait for transmission of the AC_VI frame with the backoff counter value being 0. The AP2 of AP MLD1 may assume that there is no AC_VI data in the queue until a transmission completion time of the PPDU transmitted by the STA1 of STA MLD1 on the first link, and based on the above-mentioned assumption, the AP2 of AP MLD1 may wait for transmission of the AC_VI data with the backoff counter value being 0. If data to another STA does not occur (e.g., if no data to transmit occurs in the queue) until the transmission completion time of the PPDU transmitted by the STA1 of STA MLD1 on the first link, the AP2 of AP MLD1 may initiate a transmission procedure of AC_VI data to be transmitted to the STA2 of STA MLD1 at the transmission completion time of the PPDU transmitted by the STA1 of STA MLD1 on the first link. When the channel state is in the idle state and the backoff counter of the AC corresponding to data to be transmitted is 0, the data may be transmitted immediately in the above-described transmission procedure. Alternatively, the backoff operation for data transmission in the above-described transmission procedure may be initiated again, and the data may be transmitted after completion of the backoff operation. The backoff parameters or EDCA parameters CW[AC] and/or QSRC[AC] used in the backoff operation may be the same as the previously used parameters.

The case where the AP2 of AP MLD1 invokes the backoff operation at the backoff invoke time b may correspond to a case where the AP2 of AP MLD1 considers transmission of the STA1 of STA MLD1 on the first link. At the backoff invoke time b, a case where PPDU transmission on the first link is completed and a case where PPDU transmission on the first link is not completed may be considered.

When the AP2 of AP MLD1 invokes the backoff operation at the backoff invoke time b, since the channel state is in the idle state and the backoff counter value of AC_VI is 0 at the backoff invoke time b, the AP2 of AP MLD1 may not select a new backoff counter, and maintain the backoff counter value at 0. In the instant case, transmission of the PPDU by the STA1 of STA MLD1 on the first link may have already been completed. After the transmission of the PPDU is completed on the first link, the backoff operation may be performed, and when the backoff counter reaches 0, the backoff counter on the second link is already zero, so the AP MLD1 can simultaneously transmit using both the first and second links. If PPDU transmission on the first link does not end until the backoff invoke time b, the AP MLD1 can transmit using only the second link. In the instant case, if data to another STAs does not occur until a transmission completion time of the PPDU transmitted by the STA1 of STA MLD1 on the first link (e.g., if no data to transmit occurs in the queue), the AP2 of the AP MLD1 may initiate a transmission procedure of AC_VI data to be transmitted to the STA2 of the STA MLD1 at a transmission completion time of the PPDU transmitted by the STA1 of the STA MLD1 on the first link. That is, the AP MLD1 may generate an event indicating that AC_VI data, which was assumed to be not in the AP2's queue, occurs, at the transmission completion time of the PPDU of the first link, and in the instant case, the AP2 of AP MLD1 may initiate a transmission procedure of the AC_VI data because the channel state is in the idle state and the backoff counter value is 0.

When the AP2 of AP MLD1 invokes the backoff operation at the backoff invoke time b, even if the channel state is in the idle state and the backoff counter value of AC_VI is 0, as another operation, the AP2 of AP MLD1 may perform an AC_VI backoff operation based on a new AC_VI backoff counter value for randomization. The AC_VI backoff operation may be performed by generating an event indicating that AC_VI data assumed not to be in the queue occurs. In the instant case, since the previous transmission has not failed, the AP2 of AP MLD1 may select the new AC_VI backoff counter value without changing the backoff parameters or the EDCA parameters CW[AC] and/or QSRC[AC]. The AP2 of AP MLD1 may decrease the new AC_VI backoff counter value while the channel state remains idle, and the new AC_VI backoff counter value may become 0. When the new AC_VI backoff counter value becomes 0, the AP2 of AP MLD1 may transmit an AC_VI frame. However, since the STA1 of STA MLD1 is transmitting on the first link, and the AC_VI frame is a frame to be transmitted to the STA2 of STA MLD1, the AP2 of AP MLD1 may not transmit the AC_VI frame to the STA2 of STA MLD1 when the backoff counter value is 0. That is, since the STA MLD1 is an NSTR non-AP MLD the does not support STR operations, the AP2 of AP MLD1 may wait for transmission of the AC_VI frame with the backoff counter value being 0. While waiting for transmission, it may be assumed that there is no AC_VI data in the AP2's queue, and a transmission procedure may not be initiated according to the above-mentioned assumption. If no data to another STA occurs (e.g., if no data to transmit occurs in the queue) until a transmission completion time of the PPDU transmitted by the STA1 of STA MLD1 on the first link, the AP2 of AP MLD1 may initiate a transmission procedure of AC_VI data to be transmitted to the STA2 of STA MLD1 at the transmission completion time of the PPDU transmitted by the STA1 of STA MLD1 on the first link. When the channel state is in the idle state and the backoff counter of the AC corresponding to data to be transmitted is 0, the data may be transmitted immediately in the above-described transmission procedure. Alternatively, a backoff operation for data transmission in the above-described transmission procedure may be initiated again, and the data may be transmitted after completion of the backoff operation. The backoff parameters or EDCA parameters CW[AC] and/or QSRC[AC] used in the backoff operation may be the same as the previously used parameters.

Figure 5:
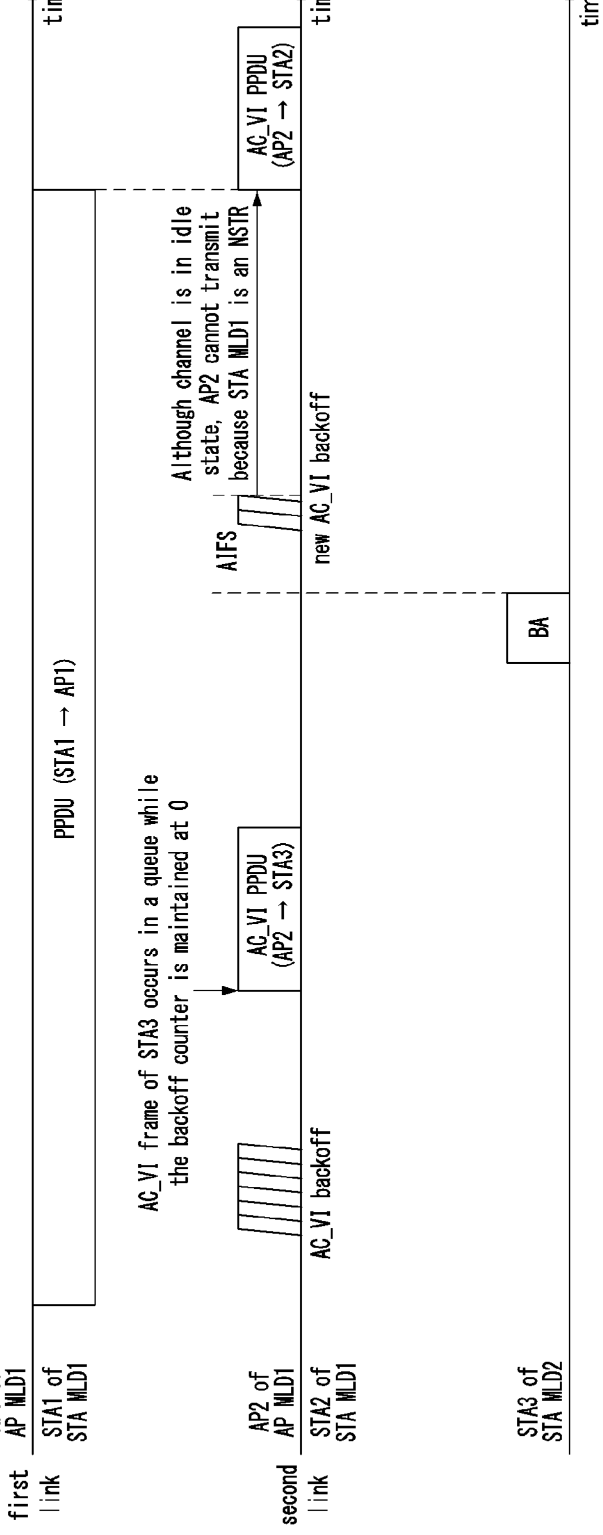
FIG. 5 is a timing diagram illustrating various exemplary embodiments of a channel access method in a wireless LAN system supporting a multi-link.

FIG. 5 is a timing diagram illustrating a third exemplary embodiment of a channel access method in a wireless LAN system supporting a multi-link.

As shown in FIG. 5, an AP MLD1 may be a STR AP MLD that supports STR operations, and a STA MLD1 may be an NSTR STA MLD that does not support STR operations. The AP MLD1 may transmit and receive data frames with the STA MLD1 using a multi-link. A STA1 of the STA MLD1 may transmit a PPDU to an AP1 of the AP MLD1 using a first link. Since the STA MLD1 does not support STR operations, a STA2 of the STA MLD1 may not be able to receive data on a second link during a period in which the STA1 of the STA MLD1 transmits the PPDU on the first link.

The AP2 of AP MLD1 may perform a backoff operation for each AC. When AC_VI data is present in a queue, the AP2 of AP MLD1 may perform a backoff operation using a backoff parameter for AC_VI (e.g., AC_VI backoff parameter). If a channel state remains idle while the backoff counter value (e.g., AC_VI backoff counter value) is decreased, the backoff counter value may become 0. When the backoff counter value becomes 0, the AP2 of AP MLD1 may transmit an AC_VI frame. However, since the STA1 of STA MLD1 is transmitting on the first link and the AC_VI frame is a frame to be transmitted to the STA2 of STA MLD1, the AP2 of AP MLD1 may not transmit the AC_VI frame even when the backoff counter value is 0. That is, since the STA MLD1 is an NSTR non-AP MLD that does not support STR operations, the AP2 of AP MLD1 may wait for transmission of the AC_VI frame with the backoff counter value being 0. The AP2 of AP MLD1 may assume that there is no AC_VI data in the queue until a transmission completion time of the PPDU transmitted by the STA1 of STA MLD1 on the first link, and based on the above-mentioned assumption, the AP2 of AP MLD1 may wait for transmission of the AC_VI data with the backoff counter value being 0.

While the AC_VI backoff counter value remains at 0 (e.g., while performing an operation 'Do Nothing' with the backoff counter value being 0), AC_VI data to be transmitted to a STA of another STA MLD (e.g., STA3 of a STA MLD2) may occur. In the instant case, since the AC_VI backoff counter value is 0, the AP2 of AP MLD1 may initiate a transmission procedure of the AC_VI data. That is, the AP2 of AP MLD1 may transmit an AC_VI frame to the STA3 of STA MLD2. When the channel state is in the idle state and the backoff counter of the AC corresponding to the data to be transmitted is 0, the data may be transmitted immediately in the above-described transmission procedure. As another method, a backoff operation for data transmission in the above-described transmission procedure may be initiated again, and the data may be transmitted after completion of the backoff operation. Backoff parameters or EDCA parameters CW[AC] and/or QSRC[AC] used in the backoff procedure may be the same as the previously used parameters. When transmission of the AC_VI frame and reception of a block ACK (BA) frame are completed, the AP2 of AP MLD1 may treat the AC_VI data to be transmitted to the STA2 of STA MLD1 as being in the queue again, without assuming that AC_VI data to be transmitted to the STA2 of STA MLD1 is not in the queue. Accordingly, the AP2 of AP MLD1 may select a new AC_VI backoff counter value and invoke an AC_VI backoff operation based on the new AC_VI backoff counter value. When the AC_VI backoff operation succeeds and the AC_VI backoff counter value is 0, and the STA1 of STA MLD1 completes PPDU transmission on the first link, the AP2 of AP MLD1 may transmit an AC_VI frame (e.g., AC_VI PPDU) to the STA2 of STA MLD1 on the second link. When the AC_VI backoff operation succeeds and the AC_VI backoff counter value is 0, but the STA1 of STA MLD1 is transmitting the PPDU on the first link, the AP2 of AP MLD1 may wait for transmission of the AC_VI PPDU with the backoff counter value being 0. The AP2 of AP MLD1 may assume that there is no AC_VI data in the queue until a transmission completion time of the PPDU transmitted by the STA1 of STA MLD1 on the first link, and based on the above-mentioned assumption, the AP2 of AP MLD1 may wait for transmission of the AC_VI data with the backoff counter value being 0. If no data to be transmitted to another STA occurs until the transmission completion time of the PPDU transmitted by the STA1 of STA MLD1 on the first link (e.g., if no data to transmit occurs in the queue), the AP2 of AP MLD1 may initiate a transmission procedure of the AC_VI data to be transmitted to the STA2 of STA MLD1 at the transmission completion time of the PPDU on the first link. That is, the AP MLD1 may generate an event indicating that AC_VI data, which was assumed to be not in the AP2's queue, occurs, at the transmission completion time of the PPDU on the first link, and in the instant case, the AP2 of AP MLD1 may initiate a transmission procedure of the AC_VI data because the channel state is in the idle state and the backoff counter value is 0. When the channel state is in the idle state and the backoff counter of the AC corresponding to the data to be transmitted is 0, the data may be transmitted immediately in the above-described transmission procedure. As another, the backoff operation for data transmission in the above-described transmission procedure may be initiated again, and the data may be transmitted after completion of the backoff operation. Backoff parameters or EDCA parameters CW[AC] and/or QSRC[AC] used in the backoff operation may be the same as the previously used parameters.

Figure 6A:
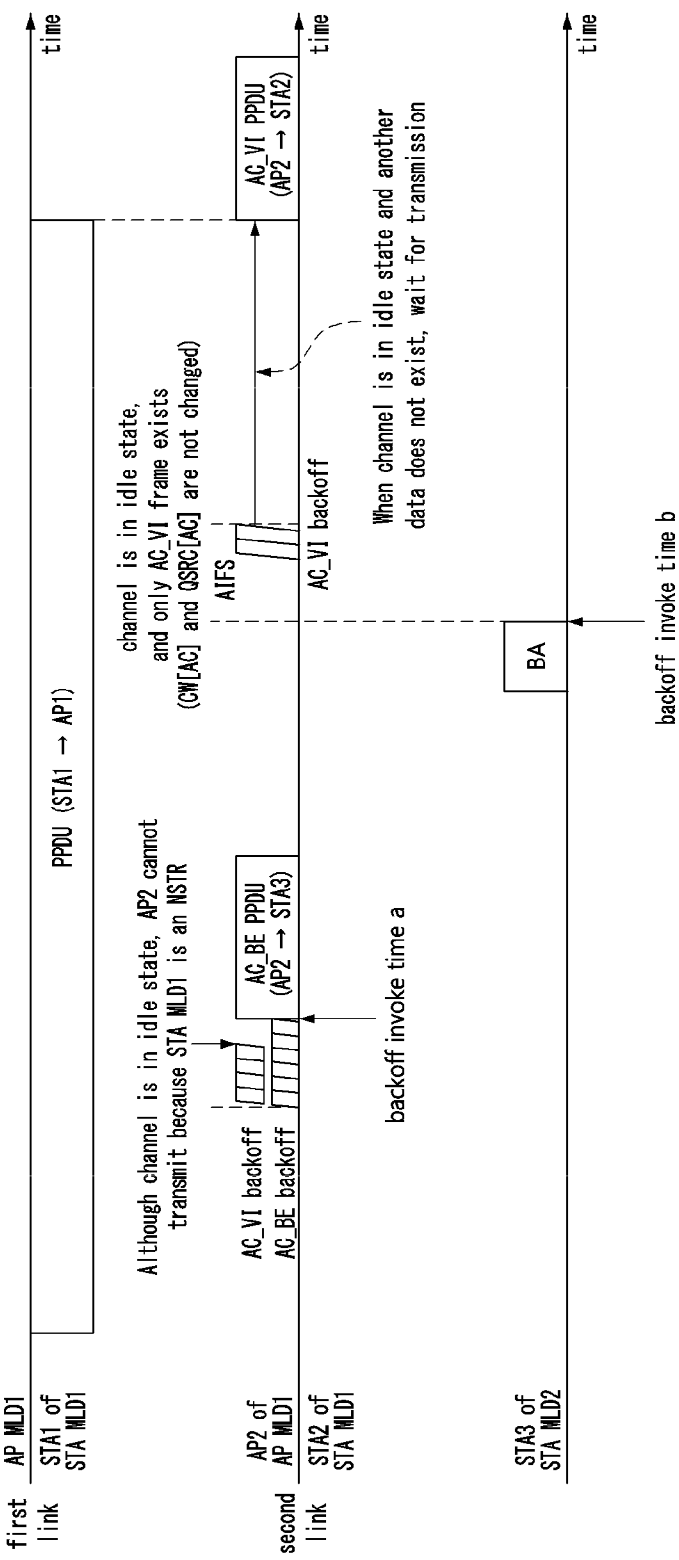
FIG. 6A is a timing diagram illustrating various exemplary embodiments of a channel access method in a wireless LAN system supporting a multi-link.

FIG. 6A is a timing diagram illustrating a fourth exemplary embodiment of a channel access method in a wireless LAN system supporting a multi-link, and FIG. 6B is a timing diagram illustrating a fifth exemplary embodiment of a channel access method in a wireless LAN system supporting a multi-link.

As shown in FIG. 6A and FIG. 6B, an AP MLD1 may be a STR AP MLD that supports STR operations, and a STA MLD1 may be an NSTR STA MLD that does not support STR operations. The AP MLD1 may transmit and receive data frames with the STA MLD1 using a multi-link. A STA1 of the STA MLD1 may transmit a PPDU to an AP1 of the AP MLD1 using a first link. Since the STA MLD1 does not support STR operations, a STA2 of the STA MLD1 may not be able to receive data on a second link during a period in which the STA1 of the STA MLD1 transmits the PPDU on the first link.

The AP2 of AP MLD1 may perform a backoff operation for each AC. When AC_VI data and AC_BE data are present in a queue, the AP2 of AP MLD1 may respectively and independently perform backoff operations for an AC_VI frame and an AC_BE frame. Even when the AC_VI backoff operation is completed first and the AC_VI backoff counter value becomes 0, since the AC_VI frame is a frame to be transmitted to the STA2 of STA MLD1, the AP2 of AP MLD1 may not be able to transmit the AC_VI frame to the STA2 of STA MLD1 because the STA2 is an NSTR device. In the instant case, the AC_VI backoff counter value may be maintained at 0, and the AP2 of AP MLD1 may wait for transmission of the AC_VI data for the STA2. The AP2 of AP MLD1 may assume that there is no AC_VI data in the queue until a transmission completion time of the PPDU transmitted by the STA1 of STA MLD1 on the first link, and based on the above-mentioned assumption, the AP2 of AP MLD1 may wait for transmission of the AC_VI data with the backoff counter value being 0.

The AC_BE backoff operation may be completed while waiting for transmission of the AC_VI data, and the AC_BE backoff counter value may become 0. If the backoff counter value of another AC becomes 0 while the AC_VI backoff counter for transmission of the AC_VI data is maintained at 0, an event indicating that AC_VI data that was assumed not to be in the queue occurs again in the queue may be generated. When both the AC_VI backoff counter value and the AC_BE backoff counter value are 0, the AP2 of AP MLD1 may transmit a frame corresponding to an AC with a higher priority based on an internal collision resolution procedure, select a new backoff counter value for a frame of an AC that has not been transmitted, and perform a backoff operation based on the new backoff counter value. In the instant case, the new backoff counter value may be selected using EDCA parameters doubled due to the collision.

The priority of AC_VI may be higher than that of AC_BE. However, since the AC_VI data is a frame to be transmitted to the STA2 of STA MLD1, but the STA MLD1 is an NSTR MLD, the AC_VI frame may be a frame that cannot be transmitted. Since the AC_BE frame is a frame transmitted to the STA MLD3 to which the NSTR condition does not apply, it may be a transmittable frame. Accordingly, among the AC_VI frame and AC_BE frame, the AC_BE frame may be considered to win in the internal collision resolution procedure. That is, the priority of the transmittable AC_BE frame may be determined to be higher than the priority of the non-transmittable AC_VI frame. In addition, even when the AC_VI backoff operation is completed before the AC_BE backoff operation, the AC_VI frame is not transmittable because the STA MLD1 is an NSTR non-AP MLD that does not support STR operations, so the AC_BE frame may be considered to win in the internal collision resolution procedure. Since the STA1 of STA MLD1, which is an NSTR MLD, is transmitting on the first link, and thus the AC_VI frame to be transmitted to the STA2 of STA MLD1 cannot be transmitted, the AC_VI frame may be considered to lose in the internal collision resolution procedure. In the instant case, backoff parameters or EDCA parameters CW[AC] and/or QSRC[AC] for the AC_VI frame may not be changed. Since the AC_BE frame is not a frame to be transmitted to the STA2 of STA MLD1 (e.g., since the AC_BE frame is a frame to be transmitted to the STA3 of STA MLD2), the AP2 of AP MLD1 may transmit the AC_BE frame to the STA3 of STA MLD2 when the AC_BE backoff counter value becomes 0. As in the exemplary embodiment of FIG. 6B, the AC_BE backoff operation may start later than the AC_VI backoff operation. The AC_BE backoff operation may be completed while the AC_VI backoff counter value is maintained at 0.

While waiting for transmission of the AC_VI frame, the channel state of the second link may change from the idle state to the busy state due to the transmission of the AC_BE frame. When the channel state changes from the idle state to the busy state, a backoff operation may be invoked. The backoff operation may be invoked by generating an event indicating that AC_VI data has occurred in the queue. A time of invoking the backoff operation may be a transmission start time of the AC_BE frame, which is a time at which the channel state changes from the idle state to the busy state. The corresponding time may be referred to as 'backoff invoke time a'. Alternatively, the time of invoking the backoff operation may be a reception time of a BA frame (e.g., ACK frame), which is a time at which the channel state changes from the busy state to the idle state. The corresponding time may be referred to as 'backoff invoke time b'. The backoff operation may be invoked by generating an event indicating that AC_VI data has occurred in the queue at the backoff invoke time b.

The case where the AP2 of AP MLD1 invokes the backoff operation at the backoff invoke time a may correspond to a case where the AP2 of AP MLD1 does not consider transmission of the STA1 of STA MLD1 on the first link. When the AP2 of AP MLD1 invokes the backoff operation at the backoff invoke time a, the channel state may be in the busy state, and the AC_VI backoff counter value may be 0. Accordingly, the AP2 of AP MLD1 may select anew AC_VI backoff counter value, and sense the channel state based on the new AC_VI backoff counter value. Since the previous transmission has not failed, the AP2 of AP MLD1 may select the new AC_VI backoff counter value without changing the backoff parameters or the EDCA parameters CW[AC] and/or QSRC[AC].

The AP2 of AP MLD1 may decrease the AC_VI backoff counter value from a time at which the channel state is changed to the idle state and while the channel state remains in the idle state. When the AC_VI backoff counter value becomes 0, the AP2 of AP MLD1 may transmit an AC_VI frame. However, when the STA1 of STA MLD1 is transmitting on the first link and the AC_VI frame is a frame to be transmitted to the STA2 of STA MLD1, the AP2 of the AP MLD1 may wait without transmitting the AC_VI frame with the backoff counter value being 0. The AP2 of AP MLD1 may assume that there is no AC_VI data in the queue until a transmission completion time of the PPDU transmitted by the STA1 of STA MLD1 on the first link, and based on the above-mentioned assumption, the AP2 of AP MLD1 may wait for transmission of AC_VI data with the backoff counter value being 0. If no frames to be transmitted to another STA occurs until the transmission completion time of the PPDU transmitted by the STA1 of STA MLD1 on the first link (e.g., if no data to transmit occurs in the queue), the AP2 of AP MLD1 may initiate a transmission procedure of the AC_VI data (e.g., AC_VI frame or PPDU) to the STA2 of STA MLD1 at the transmission completion time of the PPDU transmitted by the STA1 of STA MLD1 on the first link.

The case where the AP2 of AP MLD1 invokes the backoff operation at backoff start point b may correspond to a case where the AP2 of AP MLD1 considers transmission of the STA1 of STA MLD1 on the first link. When the AP2 of AP MLD1 invokes the backoff operation at the backoff invoke time b, the channel state may be in the idle state, and the AC_VI backoff counter value may be 0 at the backoff invoke time b. Accordingly, the AP2 of AP MLD1 may not select a new backoff counter value and may maintain the AC_VI backoff counter value at 0. If no frame to be transmitted to another STA occurs until the transmission completion time of the PPDU transmitted by the STA1 of STA MLD1 on the first link (e.g., if no data to transmit occurs in the queue), the AP2 of AP MLD1 may assume that there is no AC_VI data in the queue until the transmission complete time of the PPDU transmitted by the STA1 of STA MLD1 on the first link, and based on the above-mentioned assumption, the AP2 of AP MLD1 may wait for transmission of the AC_VI data with the backoff counter value being 0. The AP2 of AP MLD1 may initiate a transmission procedure of the AC_VI data (e.g., AC_VI frame or PPDU) to the STA2 of STA MLD1 by generating an event indicating that AC_VI data has occurred in the queue at the transmission completion time of the PPDU transmitted by the STA1 of STA MLD1 on the first link while waiting for transmission of the AC_VI data. When the channel state is in the idle state and the backoff counter of the AC corresponding to the data to be transmitted is 0, the data may be transmitted immediately in the above-described transmission procedure. Alternatively, the backoff operation for data transmission in the above-described transmission procedure may be initiated again, and the data may be transmitted after completion of the backoff operation. Backoff parameters or EDCA parameters CW[AC] and/or QSRC[AC] used in the backoff procedure may be the same as the previously used parameters. Even when the AP2 of AP MLD1 invokes the backoff operation at the backoff invoke time b, the channel state is in the idle state, and the AC_VI backoff counter value is 0, as another operation, the AP2 of AP MLD1 may perform an AC_VI backoff operation based on a new AC_VI backoff value for randomization. The AC_VI backoff operation may be invoked by generating an event indicating that AC_VI data that was assumed not to be in the queue has occurred. In the instant case, since the previous transmission has not failed, the backoff parameters or EDCA parameters CW[AC] and/or QSRC[AC] used in the performed AC_VI backoff operation may be selected without change.

The AP2 of AP MLD1 may decrease the AC_VI backoff counter value (e.g., new AC_VI backoff counter value) while the channel state remains idle. When the AC_VI backoff counter value becomes 0, the AP2 of AP MLD1 may transmit an AC_VI frame. However, since the STA1 of STA MLD1 is transmitting on the first link, and the STA MLD1 is an NSTR non-AP MLD that does not support STR operations, the AP2 of AP MLD1 may not transmit the AC_VI frame when the backoff counter value is 0. That is, the AP2 of AP MLD1 may wait for transmission of the AC_VI frame with the backoff counter value being 0. While waiting for transmission, it may be assumed that there is no AC_VI data in the AP2's queue, so the transmission procedure may not be started. If data to be transmitted to another STA does not occur (e.g., if no data to transmit occurs in the queue) until a transmission completion time of the PPDU transmitted by the STA1 of STA MLD1 on the first link, the AP2 of AP MLD1 may assume that there is no AC_VI data in the queue until the transmission completion time of the PPDU on the first link, and based on the above-mentioned assumption, the AP2 of AP MLD1 may wait for transmission of the AC_VI data with the backoff counter value being 0. The AP2 of AP MLD1 may initiate a transmission procedure of the AC_VI data (e.g., AC_VI frame or PPDU) to the STA2 of STA MLD1 by generating an event indicating that AC_VI data has occurred in the queue at the transmission completion time of the PPDU transmitted by the STA1 of STA MLD1 on the first link while waiting for transmission of the AC_VI data. When the channel state is in the idle state and the backoff counter of the AC corresponding to the data to be transmitted is 0, the data may be transmitted immediately in the above-described transmission procedure. Alternatively, the backoff operation for data transmission in the above-described transmission procedure may be initiated again, and the data may be transmitted after completion of the backoff operation. Backoff parameters or EDCA parameters CW[AC] and/or QSRC[AC] used in the backoff procedure may be the same as the previously used parameters.

The case of the backoff invoke time b may be a case for simultaneous transmissions on the first link and the second link. If the PPDU transmission on the first link is completed before the backoff invoke time b, the AP MLD1 may perform simultaneous transmissions using the first link and the second link.

Figure 7:
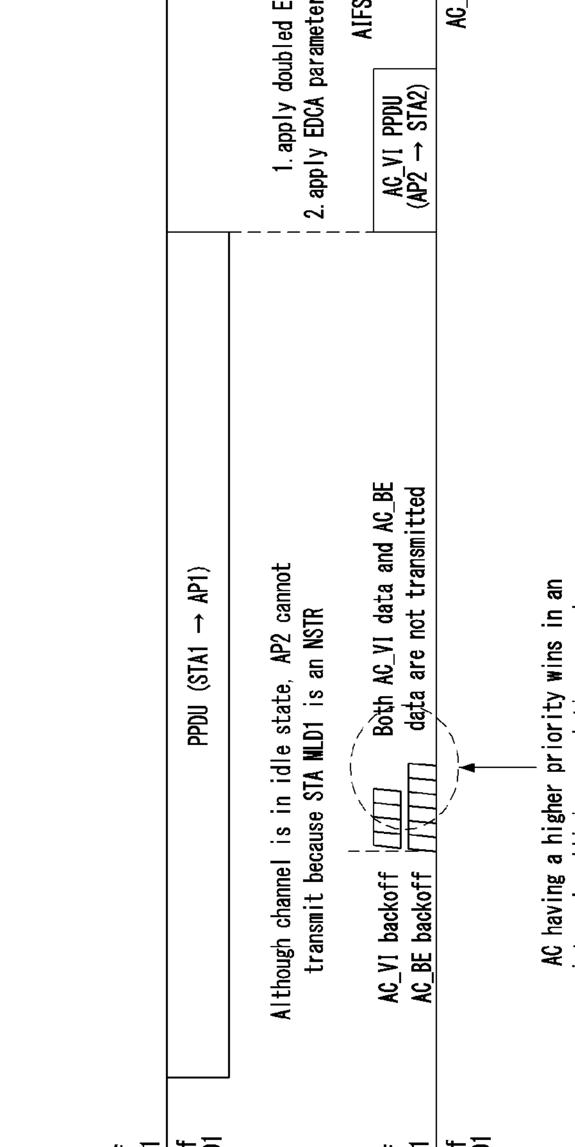
FIG. 7 is a timing diagram illustrating various exemplary embodiments of a channel access method in a wireless LAN system supporting a multi-link.

FIG. 7 is a timing diagram illustrating a sixth exemplary embodiment of a channel access method in a wireless LAN system supporting a multi-link.

As shown in FIG. 7, an AP MLD1 may be a STR AP MLD that supports STR operations, and a STA MLD1 may be an NSTR STA MLD that does not support STR operations. The AP MLD1 may transmit and receive data frames with the STA MLD1 using a multi-link. A STA1 of the STA MLD1 may transmit a PPDU to an AP1 of the AP MLD1 using a first link. Since the STA MLD1 does not support STR operations, a STA2 of the STA MLD1 may not be able to receive data on a second link during a period in which the STA1 of the STA MLD1 transmits the PPDU on the first link.

The AP2 of AP MLD1 may perform a backoff operation for each AC. When AC_VI data and AC_BE data are present in a queue, the AP2 of AP MLD1 may respectively and independently perform backoff operations for an AC_VI frame and an AC_BE frame. Even when the AC_VI backoff operation is completed first and the AC_VI backoff counter value becomes 0, since the AC_VI frame is a frame to be transmitted to the STA2 of STA MLD1, the AP2 of AP MLD1 may not be able to transmit the AC_VI frame to the STA2 of STA MLD1 because the STA2 of STA MLD1 is an NSTR non-AP MLD. In the instant case, the AC_VI backoff counter value may be maintained at 0, and the AP2 of AP MLD1 may wait for transmission of the AC_VI data for the STA2.

The AC_BE backoff operation may be completed while waiting for transmission of the AC_VI data, and the AC_BE backoff counter value may become 0. When both the AC_VI backoff counter value and the AC_BE backoff counter value are 0, the AP2 of AP MLD1 may determine a frame to transmit based on an internal collision resolution procedure. Both the AC_VI frame and the AC_BE frame may be frames to be transmitted to the STA2 of STA MLD1. Since the priority of AC_VI is higher than that of AC_BE, the AP2 of AP MLD1 may determine that the AC_VI frame wins in the internal collision resolution procedure. Since the AC_BE frame loses in the internal collision resolution procedure, the AP2 of AP MLD1 may invoke a backoff operation for the AC_BE frame. However, since the STA2 of STA MLD1 is not able to receive a frame on the second link during a period in which the STA1 of STA MLD1 transmits a PPDU on the first link, the AP2 of AP MLD1 may transmit the AC_VI frame (e.g., AC_VI PPDU) to the STA2 of STA MLD1 at the transmission completion time of the PPDU on the first link, and invoke the AC_BE backoff operation. If the AC_BE frame loses in the internal collision resolution procedure, the AP2 of AP MLD1 may select an AC_BE backoff counter value based on doubled EDCA parameters which are doubled CW[AC] and/or QSRC[AC]. Alternatively, since frame transmission was not performed because the STA MLD1 is an NSTR non-AP MLD the does not support the STR operation, the AP2 of AP MLD1 may select the AC_BE backoff counter value without doubling the EDCA parameters (e.g., CW[AC] and/or QSRC[AC]).

FIG. 8 is a timing diagram illustrating a seventh exemplary embodiment of a channel access method in a wireless LAN system supporting a multi-link.

As shown in FIG. 8, an AP MLD1 may be a STR AP MLD that supports STR operations, and a STA MLD1 may be an NSTR STA MLD that does not support STR operations. The AP MLD1 may transmit and receive data frames with the STA MLD1 using a multi-link. A STA1 of the STA MLD1 may transmit a PPDU to an AP1 of the AP MLD1 using a first link. Since the STA MLD1 does not support STR operations, a STA2 of the STA MLD1 may not be able to receive data on a second link during a period in which the STA1 of the STA MLD1 transmits the PPDU on the first link.

The AP2 of AP MLD1 may perform a backoff operation for each AC. When AC_VI data and AC_BE data are present in a queue, the AP2 of AP MLD1 may respectively and independently perform backoff operations for an AC_VI frame and an AC_BE frame. Even when the AC_BE backoff operation is completed first and the AC_BE backoff counter value becomes 0, since the AC_BE frame is a frame to be transmitted to the STA2 of STA MLD1, the AP2 of AP MLD1 may not be able to transmit the AC_BE frame to the STA2 of STA MLD1 because the STA2 of STA MLD1 is an NSTR non-AP MLD that does not support STR operations. In the instant case, the AC_BE backoff counter value may be maintained at 0, and the AP2 of AP MLD1 may wait for transmission of the AC_BE frame for the STA2.

The AC_VI backoff operation may be completed while waiting for transmission of the AC_BE frame, and the AC_VI backoff counter value may become 0. When both the AC_VI backoff counter value and the AC_BE backoff counter value are 0, the AP2 of AP MLD1 may determine a frame to transmit based on an internal collision resolution procedure. Both the AC_VI frame and the AC_BE frame may be frames to be transmitted to the STA2 of STA MLD1. Although the priority of AC_VI is higher than that of AC_BE, the AP2 of AP MLD1 may determine that the AC_BE frame for which the backoff operation succeeded first wins in the internal collision resolution procedure. Because the AC_VI frame lost in the internal collision resolution procedure, the AP2 of AP MLD1 may invoke a backoff operation for the AC_VI frame. However, since the STA2 of STA MLD1 is not able to receive a frame on the second link during a period in which the STA1 of STA MLD1 transmits a PPDU on the first link, the AP2 of AP MLD1 may transmit the AC_BE frame (e.g., AC_BE PPDU) at the transmission completion time of the PPDU on the first link, and invoke the AC_VI backoff operation. If the AC_VI lost the internal collision resolution procedure, the AP2 of AP MLD1 may select an AC_VI backoff counter value based on doubled EDCA parameters that are doubled CW[AC] and/or QSRC[AC]. Alternatively, since frame transmission was not performed because the STA MLD1 is an NSTR non-AP MLD that does not support STR operations, the AP2 of AP MLD1 may select the AC_VI backoff counter value without doubling the EDCA parameters (e.g., CW[AC] and/or QSRC[AC]).

Figure 9:
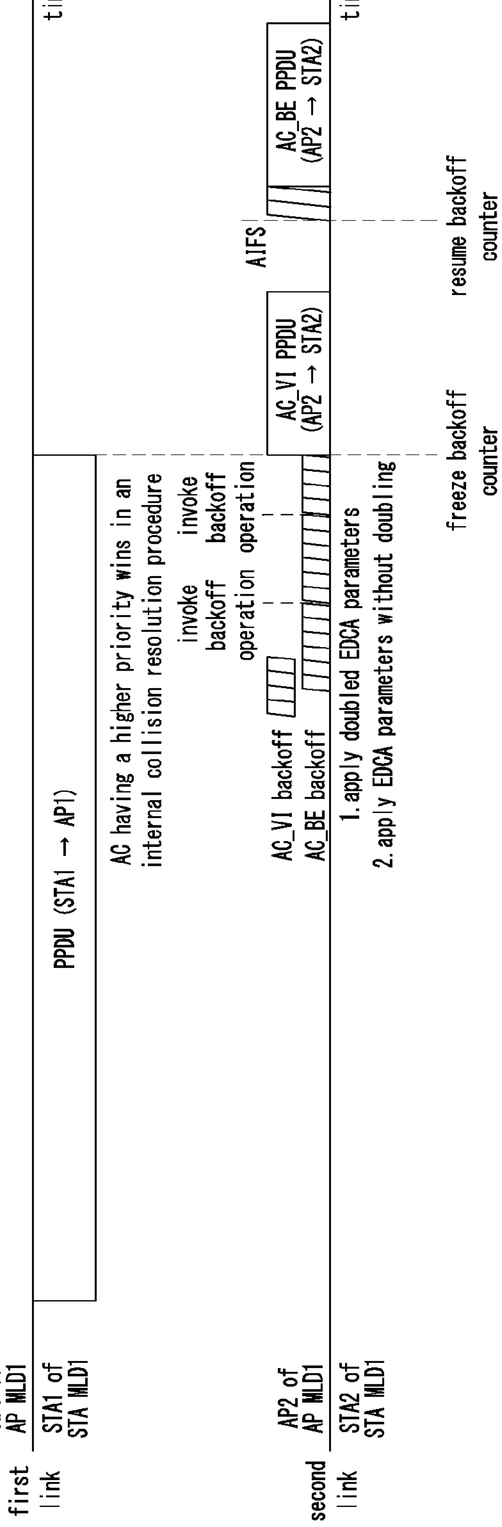
FIG. 9 is a timing diagram illustrating various exemplary embodiments of a channel access method in a wireless LAN system supporting a multi-link.

FIG. 9 is a timing diagram illustrating an eighth exemplary embodiment of a channel access method in a wireless LAN system supporting a multi-link.

As shown in FIG. 9, an AP MLD1 may be a STR AP MLD that supports STR operations, and a STA MLD1 may be an NSTR STA MLD that does not support STR operations. The AP MLD1 may transmit and receive data frames with the STA MLD1 using a multi-link. A STA1 of the STA MLD1 may transmit a PPDU to an AP1 of the AP MLD1 using a first link. Since the STA MLD1 does not support STR operations, a STA2 of the STA MLD1 may not be able to receive data on a second link during a period in which the STA1 of the STA MLD1 transmits the PPDU on the first link.

The AP2 of AP MLD1 may perform a backoff operation for each AC. When AC_VI data and AC_BE data are present in a queue, the AP2 of AP MLD1 may respectively and independently perform backoff operations for an AC_VI frame and an AC_BE frame. Even when the AC_VI backoff operation is completed first and the AC_VI backoff counter value becomes 0, since the AC_VI frame is a frame to be transmitted to the STA2 of STA MLD1, the AP2 of AP MLD1 may not be able to transmit the AC_VI frame to the STA2 of STA MLD1 because the STA MLD1 is an NSTR non-AP MLD that does not support STR operations. In the instant case, the AC_VI backoff counter value may be maintained at 0, and the AP2 of AP MLD1 may wait for transmission of the AC_VI data for the STA2.

The AC_BE backoff operation may be completed while waiting for transmission of the AC_VI frame, and the AC_BE backoff counter value may become 0. When both the AC_VI backoff counter value and the AC_BE backoff counter value are 0, the AP2 of AP MLD1 may determine a frame to transmit based on an internal collision resolution procedure. Since the AC_BE backoff operation is completed later than the AC_VI backoff operation, the AP2 of AP MLD1 may determine that the AC_BE frame loses in the internal collision resolution procedure, and may perform an AC_BE backoff operation (i.e., new AC_BE backoff operation).

Since the AC_BE frame loses in the internal collision resolution procedure, doubled EDCA parameters (e.g., CW[AC] and/or QSRC[AC]) may be applied to the AC_BE backoff operation. Alternatively, since the AC_VI frame was not transmitted after the AC_VI backoff operation was completed because the STA MLD1 is an NSTR non-AP MLD the does not support STR operations, the EDCA parameters may be applied to the AC_BE backoff operation without being doubled.

When the AC_BE backoff operation is completed during transmission by the STA1 of STA MLD1, the AP2 of AP MLD1 may invoke the backoff operation in the same manner as in the above-described exemplary embodiments. When the AC_VI backoff counter value is maintained at 0 and the AC_BE backoff operation is performed, an AC_VI frame or AC_BE frame to be transmitted to a STA other than the STA affiliated with the STA MLD1 may occur. In the instant case, as a first method, when AC_VI data to be transmitted to another STA occurs, the AP2 of AP MLD1 may transmit the corresponding AC_VI frame to the another STA. While transmitting the AC_VI frame to another STA, the AP2 of AP MLD1 may stop the AC_BE backoff operation. When transmission of the AC_VI frame to another STA is completed, the AP2 of AP MLD1 may resume the AC_BE backoff operation. The AP2 of AP MLD1 may perform an AC_VI backoff operation using new initial EDCA parameters after successfully transmitting the AC_VI frame to another STA.

As a second method, when AC_BE data to be transmitted to another STA occurs, the AP2 of AP MLD1 may perform a backoff operation for the corresponding AC_BE frame. When the AC_BE backoff operation succeeds, the AP2 of AP MLD1 may transmit the AC_BE frame at a boundary of a slot in which the AC_BE backoff counter value becomes 0. After transmitting the AC_BE frame to another STA, the AP2 of AP MLD1 may determine that the AC_VI frame loses in the internal collision resolution procedure and may perform an AC_VI backoff operation using doubled EDCA parameters. In addition, after transmitting the AC_BE frame to another STA, the AP2 of AP MLD1 may perform an AC_BE backoff operation using initial EDCA parameters (e.g., CW[AC] and/or QSRC[AC]).

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

In the present specification, unless particularly stated otherwise, a singular expression includes a plural expression unless the context clearly indicates otherwise.

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of an access point multi-link device (AP MLD), the method comprising:

performing, by a processor, a first backoff for a first data unit on a first link;

after completing the first backoff on the first link, determining that communication of a first non-AP MLD, which is a recipient of the first data unit is performed on a second link; and based on a determination that the communication of the first non-AP MLD on the second link is completed, initiating, by the processor, a first transmission procedure of the first data unit on the first link, wherein the first link and the second link are included in a non-simultaneous transmit and receive (NSTR) link pair for the first non-AP MLD.

2. The method of claim 1, wherein, when the communication of the first non-AP MLD which is the recipient of the first data unit is performed on the second link after completing the first backoff on the first link, a counter value of the first backoff is maintained at 0.

3. The method of claim 1, wherein, based on a determination that the communication of the first non-AP MLD is performed on the second link, a queue for a first access category (AC) associated with the first backoff is considered to be empty.

4. The method of claim 1, further comprising:

in response to the occurrence of a second data unit for a first AC to be transmitted to a second non-AP MLD, initiating a second transmission procedure for the second data unit on the first link.

5. The method of claim 1, wherein the first non-AP MLD does not support a simultaneous transmit and receive (STR) operation on the first link and the second link.

6. The method of claim 1, further including:

performing, by the processor, a second backoff for a second data unit on the first link; and in response that the first backoff and the second backoff are completed on the first link, performing, by the processor, a transmission based on one backoff among the first backoff and the second backoff, wherein the one backoff is determined based on a preconfigured criterion.

7. The method of claim 6, wherein the performing the transmission based on one backoff among the first backoff and the second backoff comprises, in case that the one backoff is the first backoff, initiating, by the processor, a second transmission procedure of the second data unit after completion of the first transmission procedure.

8. The method of claim 6, wherein in case that the preconfigured criterion is a completion order of backoff, the one backoff comprises a backoff that is completed first among the first backoff and the second backoff.

9. The method of claim 6, wherein when the preconfigured criterion is a priority of an access category (AC), the one backoff comprises a backoff associated with an AC having a highest priority among the first backoff and the second backoff.

10. An access point multi-link device (AP MLD) comprising:

at least one processor; and a memory configured for storing one or more instructions executable by the at least one processor, wherein the one or more instructions are executed to:

perform a first backoff for a first data unit on a first link;

after completing the first backoff on the first link, determine that communication of a first non-AP MLD, which is a recipient of the first data unit is performed on a second link; and based on a determination that the communication of the first non-AP MLD on the second link is completed, initiate a first transmission procedure of the first data unit on the first link, wherein the first link and the second link are included in a non-simultaneous transmit and receive (NSTR) link pair for the first non-AP MLD.

11. The AP MLD of claim 10, wherein, when the communication of the first non-AP MLD which is the recipient of the first data unit is performed on the second link after completing the first backoff on the first link, a counter value of the first backoff is maintained at 0.

12. The AP MLD of claim 10, wherein, based on a determination that communication of the first non-AP MLD is performed on the second link, a queue for the first access category associated with the first backoff is considered to be empty.

13. The AP MLD of claim 10, wherein the one or more instructions are further executed to, in response to the occurrence of a second data unit for a first AC to be transmitted to a second non-AP MLD, initiate a second transmission procedure for the second data unit on the first link.

14. The AP MLD of claim 10, wherein the first non-AP MLD does not support a simultaneous transmit and receive (STR) operation on the first link and the second link.

15. The AP MLD of claim 10, wherein the one or more instructions are further executed to:

perform a second backoff for a second data unit on the first link; and in response that the first backoff and the second backoff are completed on the first link, perform a transmission based on one backoff among the first backoff and the second backoff, wherein the one backoff is determined based on a preconfigured criterion.

16. The AP MLD of claim 15, wherein the one or more instructions are further executed to perform: in case that the one backoff is the first backoff, initiating a second transmission procedure of the second data unit after completion of the first transmission procedure.

17. The AP MLD of claim 15, wherein when the preconfigured criterion is a completion order of backoff, the one backoff comprises a backoff that is completed first among the first backoff and the second backoff.

18. The AP MLD of claim 15, wherein when the preconfigured criterion is a priority of an access category (AC), the one backoff comprises a backoff associated with an AC having a highest priority among the first backoff and the second backoff.

* * * * *